US010306826B2

(12) United States Patent
Owenby (10) Patent No.: US 10,306,826 B2
(45) Date of Patent: Jun. 4, 2019

(54) SPINNER FOR A PARTICULATE MATERIAL SPREADER (71) Applicant: SALFORD BBI INC., Cornelia, GA (US)

(72) Inventor: Steve Owenby, Blairsville, GA (US)

(73) Assignee: SALFORD BBI INC., Cornelia, GA (US)

(*) Notice: Subject to any disclaimer, the term of this patent is extended or adjusted under 35 U.S.C. 154(b) by 0 days.

(21) Appl. No.: 15/505,663

(22) PCT Filed: Aug. 22, 2015

(86) PCT No.: PCT/IB2015/056366
§ 371 (c)(1),
(2) Date: Feb. 22, 2017

(87) PCT Pub. No.: WO2016/027260
PCT Pub. Date: Feb. 25, 2016

(65) Prior Publication Data
US 2017/0273236 A1 Sep. 28, 2017

Related U.S. Application Data (60) Provisional application No. 62/040,515, filed on Aug. 22, 2014.

(51) Int. Cl.
A01C 17/00 (2006.01)
E01C 19/20 (2006.01)

(52) U.S. Cl.
CPC .......... A01C 17/001 (2013.01); E01C 19/201 (2013.01); A01C 17/005 (2013.01);
(Continued)

(58) Field of Classification Search
CPC ... A01C 17/001; A01C 17/005; A01C 17/006; E01C 19/201; E01C 19/202; E01C 19/203; E01C 2019/2075
(Continued)

(56) References Cited

U.S. PATENT DOCUMENTS 2,031,540 A * 2/1936 Macaulay ................ A01C 7/02
198/642
2,085,171 A * 6/1937 Sheard .................... A01F 12/40
239/682

(Continued)

OTHER PUBLICATIONS

International Search Report and Written Opinion on PCT/IB2015/056366 dated Feb. 2, 2016.

Primary Examiner — Steven J Ganey
Assistant Examiner — Joseph A Greenlund
(74) Attorney, Agent, or Firm — Michael Stanley Tomsa; McAndrews, Held & Malloy, Ltd.

(57) ABSTRACT

An apparatus for broadcasting particulate or granular material over a ground surface involves a variable speed spinner and a material conveyor. The spinner is positioned generally horizontally below a discharge end of a material conveyor. The spinner has a disk having a generally radially disposed fin fixed to an upper side of the disk and radiating outwardly from a center of the disk. The spinner is positioned to receive material from the material conveyor at a location about half way along a length of the fin. In a method broadcasting particulate or granular material over a ground surface, the spinner is preferably rotated at a speed of 900-1000 rpm. The apparatus and method provide for distribution of material over greater distances and can do so without pulverizing the material, creating a uniform pattern of distribution over a 50% wider swath.

24 Claims, 6 Drawing Sheets (52) U.S. Cl.
CPC .......... *A01C 17/006* (2013.01); *E01C 19/202* (2013.01); *E01C 19/203* (2013.01); *E01C 2019/2075* (2013.01)

(58) Field of Classification Search
USPC ....... 239/146, 667, 668, 665, 672, 673, 677, 239/682
See application file for complete search history.

(56) References Cited

U.S. PATENT DOCUMENTS

| | | | | |
|---|---|---|---|---|
| 2,162,689 A * | 6/1939 | Mayfield | ................ | A01C 15/18 239/673 |
| 2,200,165 A * | 5/1940 | Fulkerson | .............. | A01C 17/00 239/671 |
| 2,565,427 A * | 8/1951 | Herd | ....................... | A01C 17/00 222/410 |
| 2,594,084 A * | 4/1952 | Skibbe | ................. | A01C 17/006 239/661 |
| 3,099,369 A * | 7/1963 | Schatz | .................... | E01C 19/20 222/238 |
| 3,156,473 A * | 11/1964 | De Biasi | ............. | A01C 17/006 198/640 |
| 3,232,626 A * | 2/1966 | Polzin | .................... | A01C 17/00 239/665 |
| 3,368,762 A * | 2/1968 | Dreyer | ................. | A01C 17/001 239/665 |
| 3,417,926 A * | 12/1968 | De Vorak | ................. | A01C 3/06 184/6.15 |
| 3,539,113 A * | 11/1970 | Tyler | .................... | A01C 17/001 239/667 |
| 3,592,394 A * | 7/1971 | Sinden | ................. | A01C 17/003 198/620 |
| 4,381,080 A * | 4/1983 | van der Lely | ......... | A01C 17/00 239/666 |
| 4,510,883 A * | 4/1985 | Estes | ........................ | E21F 5/10 118/305 |
| 4,597,531 A * | 7/1986 | Kise | ..................... | A01C 17/006 239/650 |
| 4,684,068 A * | 8/1987 | Busboom | ................ | A01F 12/40 239/288.5 |
| 4,725,005 A * | 2/1988 | Wiegelmann | ........ | A01C 17/008 198/642 |
| 4,836,456 A * | 6/1989 | van der Lely | ......... | A01C 17/00 239/661 |
| 4,972,884 A * | 11/1990 | Souers | .................... | B01J 8/002 141/1 |
| 5,082,186 A * | 1/1992 | Bruns | ................ | A01D 41/1243 239/667 |
| 5,203,510 A * | 4/1993 | Courtney | ............ | A01C 17/006 239/667 |
| 5,215,500 A * | 6/1993 | Kirby | ................ | A01D 41/1243 239/667 |
| 5,649,666 A * | 7/1997 | Lewis | ..................... | B60P 1/42 239/657 |
| 5,842,649 A * | 12/1998 | Beck | .................... | A01C 15/008 239/677 |
| 5,941,464 A * | 8/1999 | Seymour | ................ | A01C 3/063 239/675 |
| 6,027,052 A * | 2/2000 | Strieker | ................... | A01D 87/10 239/654 |
| 6,092,745 A * | 7/2000 | Seymour | ............... | A01C 17/001 239/63 |
| 6,149,079 A * | 11/2000 | Kinkead | .............. | A01C 15/122 239/661 |
| 6,209,808 B1 * | 4/2001 | Anderson | ............ | A01C 17/006 239/666 |
| 6,220,532 B1 * | 4/2001 | Manon | .................... | A01C 15/18 239/672 |
| 6,517,281 B1 * | 2/2003 | Rissi | ..................... | E01C 19/203 239/659 |
| 6,572,035 B1 * | 6/2003 | Pfeiffer | .............. | A01D 41/1243 239/650 |
| 6,598,812 B1 * | 7/2003 | Matousek | .......... | A01D 41/1243 239/682 |
| 6,715,696 B2 * | 4/2004 | Pierce | ................... | E01C 19/203 239/172 |
| 6,817,552 B2 * | 11/2004 | Kinkead | ............... | A01C 17/001 239/668 |
| 7,044,408 B2 * | 5/2006 | Schoenfeld | .......... | A01C 17/001 239/659 |
| 7,293,723 B2 * | 11/2007 | Niemela | ................. | A01C 15/14 239/650 |
| 7,306,174 B2 * | 12/2007 | Pearson | ............. | A01D 41/1243 239/663 |
| 7,380,733 B2 * | 6/2008 | Owenby | ................ | A01C 7/122 239/656 |
| 7,473,171 B1 * | 1/2009 | Schwinn | ........... | A01D 41/1243 460/111 |
| 7,540,436 B2 * | 6/2009 | Truan | ..................... | A01C 15/006 222/161 |
| 8,411,589 B2 * | 4/2013 | Ikeda | ...................... | H04L 41/12 370/254 |
| 8,844,846 B2 * | 9/2014 | Owenby | ................... | F17D 3/00 239/672 |
| 9,649,646 B1 * | 5/2017 | Podoll | .................... | B05B 7/0815 |
| 2003/0098373 A1 * | 5/2003 | Smith | .................... | A01C 15/16 239/668 |
| 2003/0192967 A1 | 10/2003 | Rissi | | |
| 2004/0026544 A1 * | 2/2004 | Williams | .............. | E01C 19/203 239/656 |
| 2011/0168800 A1 * | 7/2011 | Warchola | .............. | E01C 19/203 239/7 |
| 2011/0186649 A1 | 8/2011 | Richardson et al. | | |
| 2011/0303769 A1 * | 12/2011 | Sandler | ................. | E01C 19/203 239/672 |
| 2014/0117122 A1 * | 5/2014 | Pare | ...................... | E01C 19/203 239/668 |
| 2015/0330045 A1 * | 11/2015 | Kime | .................... | E01C 19/203 239/7 |
| 2016/0150724 A1 * | 6/2016 | Browning | ............ | A01C 15/007 239/1 |

* cited by examiner

SPINNER FOR A PARTICULATE MATERIAL SPREADER

CROSS-REFERENCE TO RELATED APPLICATIONS

This application is a National Phase Entry of PCT International Application No. PCT/IB2015/056366, which was filed Aug. 22, 2015, and claims the benefit under 35 U.S.C. § 119(e) of United States Provisional Patent Application U.S. Ser. No. 62/040,515 filed Aug. 22, 2014, the entire contents of both of which are herein incorporated by reference.

FIELD

The present invention relates to an improved spreader system of the type used to mix and distribute particulate material ingredients, such as dry bulk material, and broadcast them over a ground surface such as an agricultural field.

BACKGROUND

It is generally known to provide a system for spreading or broadcasting particulate material, such as fertilizer, lime and fertilizer supplements, over a ground surface. For example, U.S. Patent US 2003/0192967 to Rissi discloses a spreader system for particulate material including an adjustable spinner. The adjustable spinner is incrementally adjustable forwardly and rearwardly to a plurality of operating positions relative to the discharge end of a material conveyor. The adjustment may be manual or automatic to adjust the drop point of the material onto the optimum location on the spinner system, thereby accommodating varying application rates and patterns of particulate material distribution across the swath.

U.S. Pat. No. 7,380,733 to Owenby, et al. discloses a plural bin metering system for broadcasting material ingredients. Spinners are provided rearwardly of the system for broadcasting the material. The spinners are fixed in position, and their speed of rotation is variably controllable.

These devices are limited in their distribution of particulate matter. There is a need for equipment that is capable of spreading particulate materials/ingredients over greater distances and without altering the particulate makeup of the material for example without substantially changing the particulate size of the material or its size distribution.

SUMMARY

The spreader system of the present disclosure is designed to meet the aforementioned needs. More particularly, the present spreader system provides for distribution of particulate or granular material over greater distances and can do so without pulverizing the material, creating a uniform pattern of distribution over a 50% wider swath. It allows for spreading particulate material at distances greater than an eighty (80) foot swath up to a swath of one hundred twenty (120) feet or more. For heavier materials such as lime, the distances can be as high as 60 feet or more, which is still greater than other spreaders for lime. Further, it is less complicated, costs less than existing devices and is less expensive to maintain than other designs.

In various embodiments of the present disclosure, a spreader system and method is provided for broadcasting particulate or granular material over a ground surface. The spreader system can include one or more spinners positioned generally horizontally below the discharge end of a material conveyor. Each spinner can be rotated by a motor. The motor can be a variably controllable motor for controlling the rate of rotation of the spinner and therefore the broadcast pattern of the particulate material over the ground surface. Each spinner can include a disk and one or more fins fixed to the top or upper side of the disk. The one or more fins are generally radially disposed on the top of the disk radiating outwardly from the center of the disk. The one or more fins can be fixed in an upwardly projecting or upright position generally perpendicular to the top surface of the disk. The one or more fins are preferably positioned exactly perpendicularly, i.e. at an angle of 90° to the top surface of the disk. A top edge portion of the fin can be angled relative to the perpendicular portion of the fin or, preferably, can maintain perpendicularity in a continuous fashion up to the top edge. Their orientation can be positioned radially outwardly from the center to the outer diameter, advanced 17° or retarded 17° in relation to a radial line, for example a radial line perpendicular to the top surface of the disk, to provide additional versatility in pattern control, or anywhere in between. The disks can be, but need not be, dish-shaped, wherein the center of the disk can be below the horizontal plane of the periphery of the disk. The disk can be generally circular in shape and can have a diameter of about 24" to about 36". In one or more aspects at least one fin can have a length of about 7" to about 20", preferably about 7" to about 17", more preferably about 14" to about 18". In one or more aspects at least one or more fins are radially positioned on the top of the disk such that the end(s) closest to the center of the disk (the "proximal end") are approximately flush with the center shaft of the disk, thereby ensuring that all incoming materials are captured by or directed onto the fins for uniform acceleration. In various aspects all of the fins can extend radially outwardly from the center of the disk beyond the periphery of the disk, such that their distal ends lie beyond the periphery of the disk.

The overall diameter of the spinner disks and fin lengths are configured such that material to be spread enters the spinner system at a location about half way along the length of the fin and is caught by the fin traveling at a speeds of 60 to 70 feet per second and then accelerates along the length of the fins to an end of the fin's radial length to achieve the desired velocities of 110 to 157 feet per second, depending on the desired swath width. For example, spinner disks and fin lengths may be configured such that material to be spread enters the spinner system approximately 7" to 9" radially from the center of the disk. The material may be caught by the fin traveling at a speeds of 60 to 70 feet per second and then accelerates along the length of the fins to a radial length to 14" to 18" to achieve the desired velocities of 110 to 157 feet per second, depending on the desired swath width. The fins are available in various lengths and can be interchanged to achieve desired distribution swath widths. With this design, the material travels from the discharge conveyor through the flow divider onto the spinners in a laminar like flow and accelerates to the desired velocity to achieve a wider, yet uniform spread pattern. As the operator decides what spread swath width is desired, he/she then chooses a particular length of fins to attach and sets the spinner rpms accordingly. The spinner can be of variable speed achieved through use of, for example, a variable speed hydraulic motor and can be adjusted to speeds in the range of 700 to 1100 rpm, preferably 900 to 1100 rpm, more preferably 900-1000 rpm, for example about 1000 rpm. This design achieves spread patterns 40% to 50% wider than traditional designs.

In another non-limiting embodiment of the present disclosure, the spreader system is designed to be incorporated with a material bin system. The bin system of this embodiment includes one or more particulate material ingredient bins or hoppers. The hoppers can be rectangular shaped with a tapered or trapezoidal bottom portion when seen in end view. Each hopper can have associated with it a material metering device for independently controlling the rate of metering or discharge of particulate material held within its associated hopper with respect to the discharge of particulate material from the one or more hoppers. The metering device of at least one, if not all, of the particulate material hoppers can be controllable allowing the rate of discharge of particulate material from the hopper(s) to be varied as desired.

One or more take away conveyors can be disposed below and extend rearwardly of the one or more hoppers for receiving particulate material discharged from the hopper(s). Particulate material discharged from the hopper(s) can be discharged onto the one or more take away conveyors. In a non-limiting example, more than one take away conveyor can be provided. Also more than one hopper can be provided. Each hopper can be provided with an independently variably controllable metering device, thereby allowing variable control rate of discharge of material from the hopper(s). Each hopper can discharge its material onto a take away conveyor solely associated with the given hopper, can discharge its material collectively onto a single take away conveyor, or combination thereof.

The take away conveyor(s) can receive the particulate material discharged from the one or more hoppers and deliver the material to the spreader system for spreading or broadcasting the material ingredients over a ground surface.

Means can be provided for individually controlling the discharge rates of the particulate material from the hopper(s) as well as the discharge rate of combined particulate material to be spread or broadcast over a ground surface. Each hopper can have its own individual metering device for controlling the rate of discharge of particulate material from a hopper independently of the rate of discharge of particulate material from any other hopper. Additionally, the rate at which the combined particulate material is discharged and the resulting distribution pattern can be controlled by controlling the rate at which the take away conveyor(s) operate either alone or in conjunction with controlling the rate of rotation of the spinners of the spreader system, respectively. Some or all of the aforementioned parameters can be computer controlled by an operator of the spreader to achieve the optimum combination of spreading rate and distribution for one or more particulate materials. In this manner, when two or more hoppers are used to distribute multiple material ingredients, both the ratio of the multiple particulate material ingredients can be controlled as well as the overall discharge rate of a combination of particulate material ingredients.

Other spreader systems, devices, features and advantages of the disclosed system will be or become apparent to one with skill in the art upon examination of the following drawings and detailed description. It is intended that all such additional systems, devices, features, and advantages be included within this description, be within the scope of the present invention, and be protected by the accompanying claim(s).

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings. The components of the drawings are not necessarily to scale, emphasis instead being placed on clearly illustrating the principles of the present invention. Moreover, in the drawings, like reference numerals do not need corresponding parts throughout the several views.

DETAILED DESCRIPTION

Referring more specifically to the drawings in which like reference numerals refer to like elements throughout the several views, an exemplary non-limiting embodiment of a spreader system of the present disclosure is illustrated in FIGS. 1-6. An embodiment of a spreader system is illustrated for broadcasting particulate or granular material over a ground surface. In the figures the spreader system includes one or more spinners 10. Each spinner can be operated by a drive motor 10a. The drive motor can be a variable speed motor allowing for adjustment of the rate of operation of the its associated spinner 10 for distribution or broadcast of particulate material ingredients.

As illustrated, spinners 10 are in the form of disks 10b positioned below and off the end of take away conveyor 6. The disks can be, but need not be, positioned substantially horizontally with respect to the conveyor 6. The disks 10b may be flat or, preferably, concave. Each disk 10b is mounted on a generally vertically disposed shaft 10c with the disk 10b positioned generally parallel to the surface on which the material ingredients are to be distributed. Disks 10b are designed for rotation about shafts 10c. Drive motors 10a are operably connected to shafts 10c for controlling the rate of rotation of spinners 10 and thereby the rate of distribution of material ingredients from spinners 10 over a ground surface below.

Figure 6:
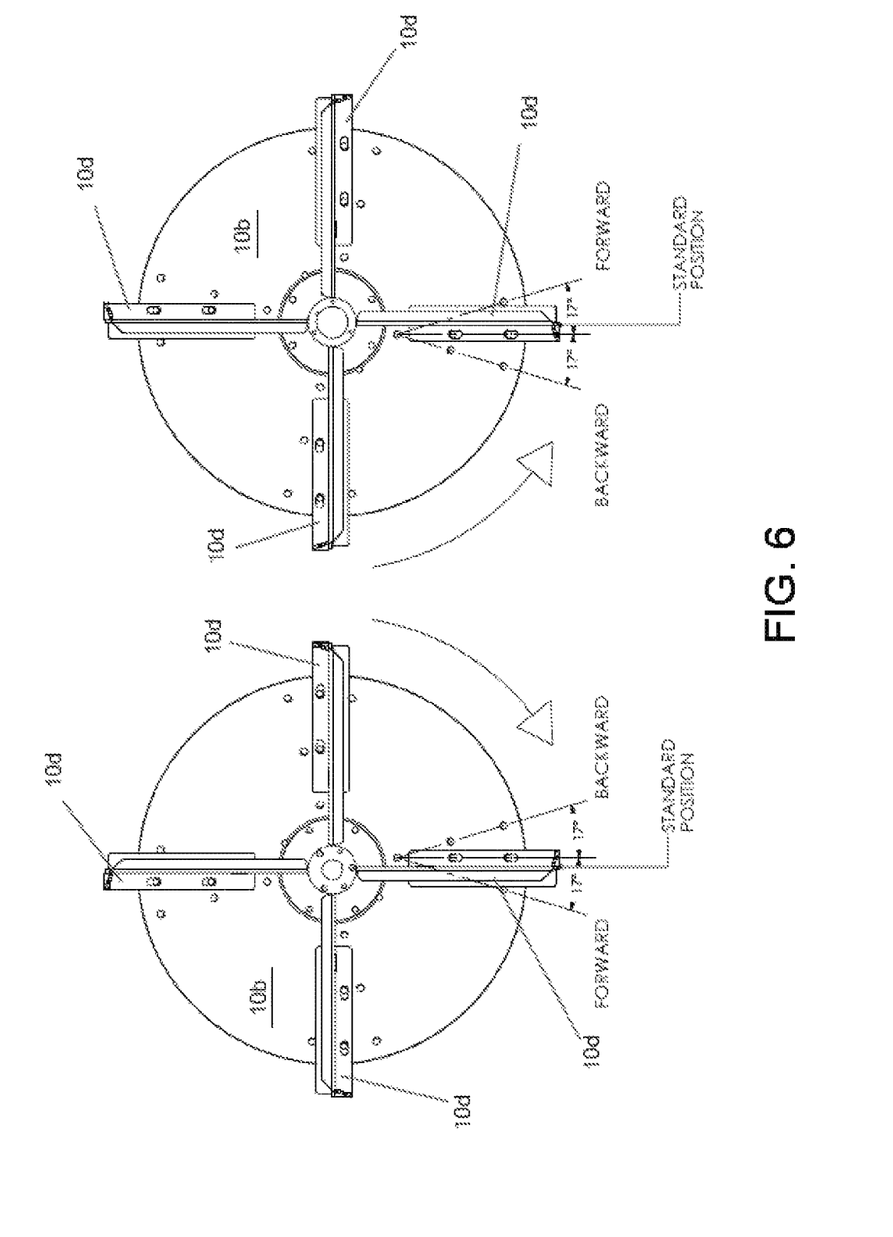
FIG. 6 is a top plan view of an exemplary pair of spinners of an embodiment of a spreader system of the present disclosure.

Each disk 10b can include one or more fins 10d to assist in distributing material ingredients from spinners 10. The one or more fins 10d can be fixed to the top or upper side of the disk 10b. In various aspects, the one or more fins 10d can be fixed in an upwardly projecting or upright position. For example the one or more fins 10d can be positioned generally perpendicular to the top surface of the disk 10b. The one or more fins need not be positioned exactly perpendicular, i.e. at an angle of 90° to the top surface of the disk. An exemplary embodiment of a pair of spinners is depicted in FIG. 6. As illustrated in FIG. 6, their orientation can be positioned outwardly from the center to the outer diameter, advanced forward 17° or retarded back 17° in relation to a line perpendicular to the top surface of the disk, or anywhere in between, to provide additional versatility in pattern control. The disks 10*b* can be generally circular in shape and can have a diameter of about 24" to about 36". The one or more fins 10*d* can be radially positioned on the top of the disk 10*a* so the fins extend radially outwardly from the center of the disk 10*b*. At least one of the fins 10*d* radiates outwardly from the center of the disk 10*b* beyond the periphery of the disk. In one or more aspects the at least one fin can have a length of about 7" to about 17".

In one or more embodiments, the aforementioned spreader system can be incorporated with a material bin system. The bin system can include a particulate material ingredient hopper 7. In one or more aspects, the bin system can include one or more additional hoppers as depicted for example in U.S. Pat. No. 7,380,733, which is incorporated by reference as if fully set forth herein. The additional hopper(s) can be and one or more secondary material ingredient hopper(s). For example, two secondary particulate material ingredient hoppers can be provided. The secondary material ingredient hoppers can be positioned rearwardly of hopper 7. Hopper 7 can be a primary particulate material ingredient hopper. The one or more hopper(s) can be supported by a frame 14 including support rails 15. Each hopper can have generally converging walls leading to a discharge port, allowing for gravitational feed and discharge of particulate material ingredients contained within each respective hopper. The hopper(s) can be generally designed for holding and discharging dry, bulk granular materials such as but not limited to fertilizer, fertilizer supplements, herbicides, insecticides, fungicides, soil pH adjusting materials, micronutrients, and the like. The hopper(s) can be fixed to rails 15 or can be selectively removable.

A controllable metering system can be provided for any one or all hoppers provided. In a non-limiting example, the hopper 7 includes a transition box 4 into which its particular material flows. The material from the transition box 4 is discharged to take away conveyor 6, such as a bed chain conveyor or chain mesh conveyor that directs the particulate material to rear roller 1. Rear roller 1 can serve to deliver the material ingredients to the spreader system including the one or more spinners 10 that serve to distribute or broadcast the particulate material over a ground surface, such as an agricultural field, food plots within wooded areas, turf and golf course applications and vineyards.

Rear roller 1 can be operated by a gear case and one or more hydraulic motors 1*a*. Rear roller 1 can serve to drive the take away conveyor 6. Thus, adjusting the speed of rotation of roller 1 by hydraulic motor 1*a* can serve to control the speed of the take away conveyor 6. In other aspects a plurality of take away conveyors can be provided, for example one for each hopper, when multiple hoppers are provided.

Figure 1:
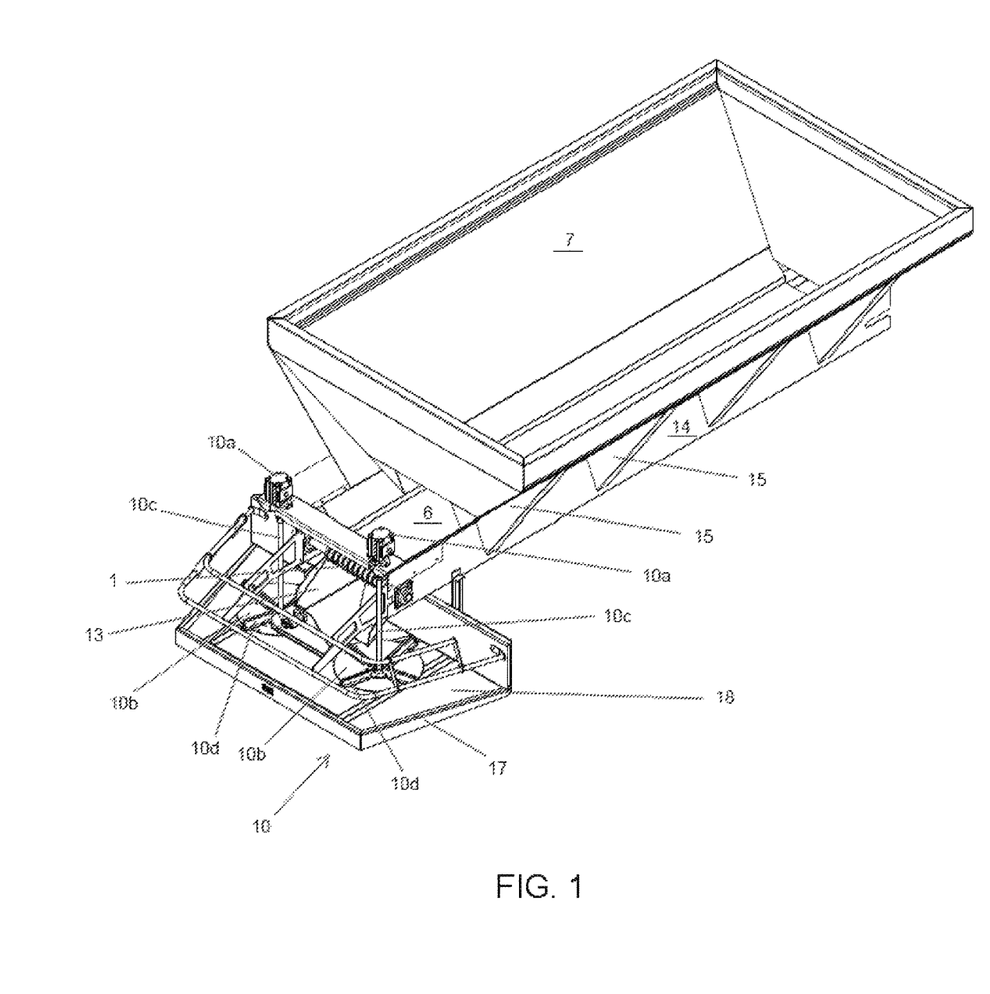
FIG. 1 is a perspective view of an exemplary embodiment of a spreader system of the present disclosure, taken from the rear of the system.
Figure 2:
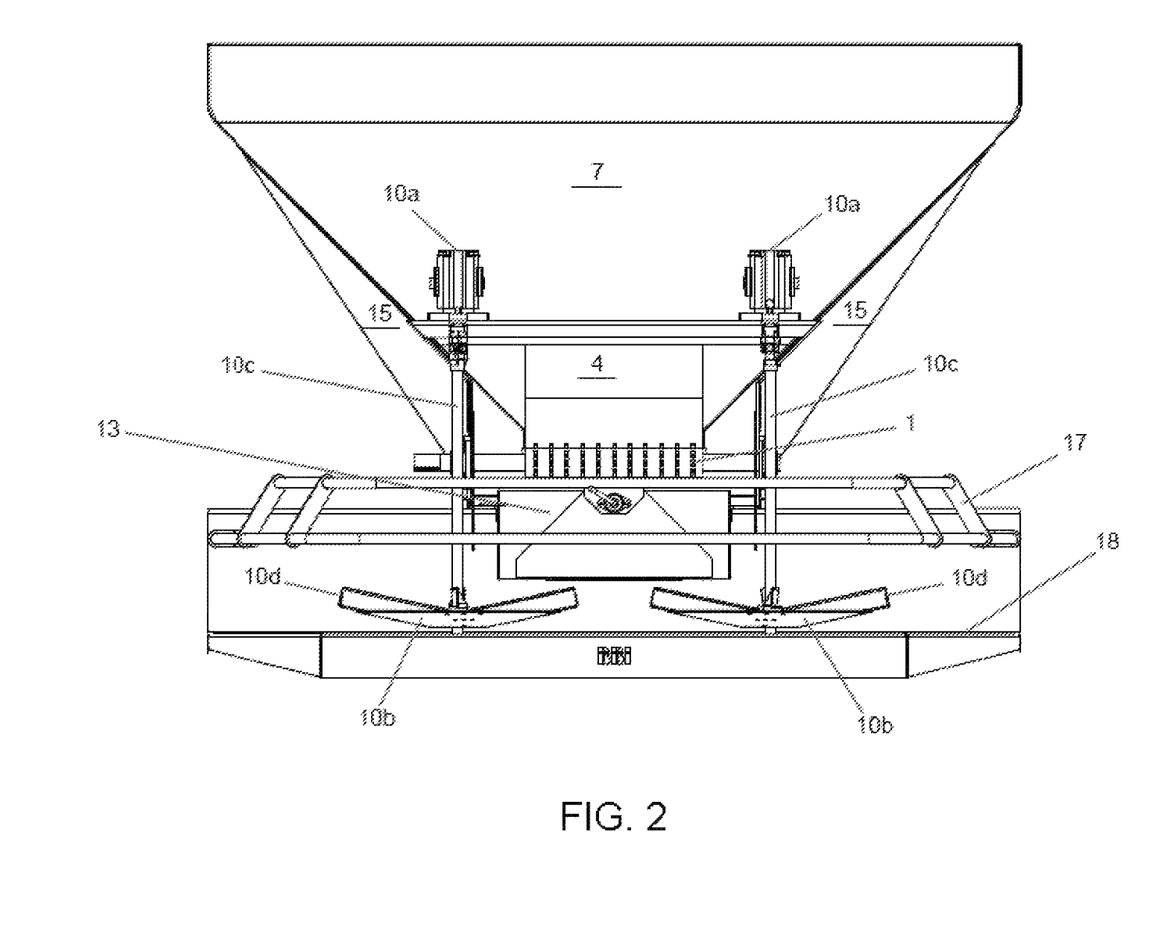
FIG. 2 is a rear elevational view of the system of FIG. 1.
Figure 3:
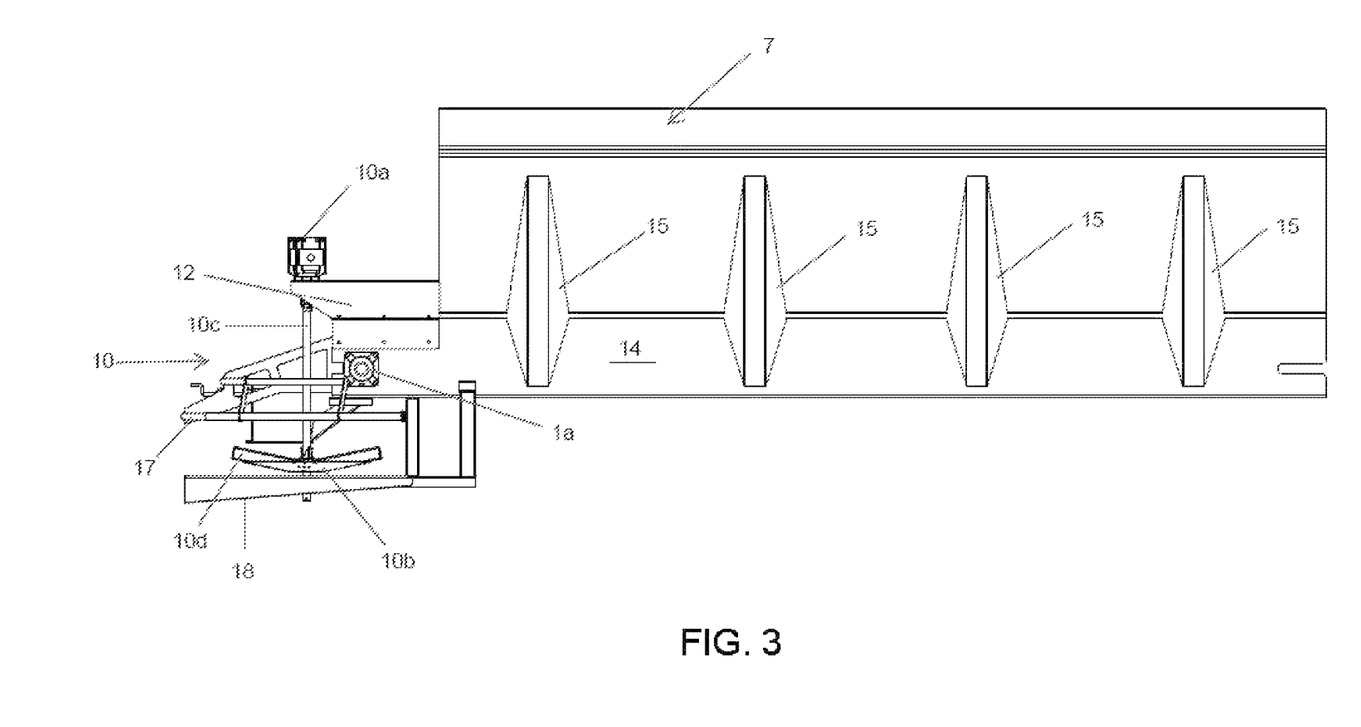
FIG. 3 is a right side elevational view of the system illustrated in FIG. 1.
Figure 4:
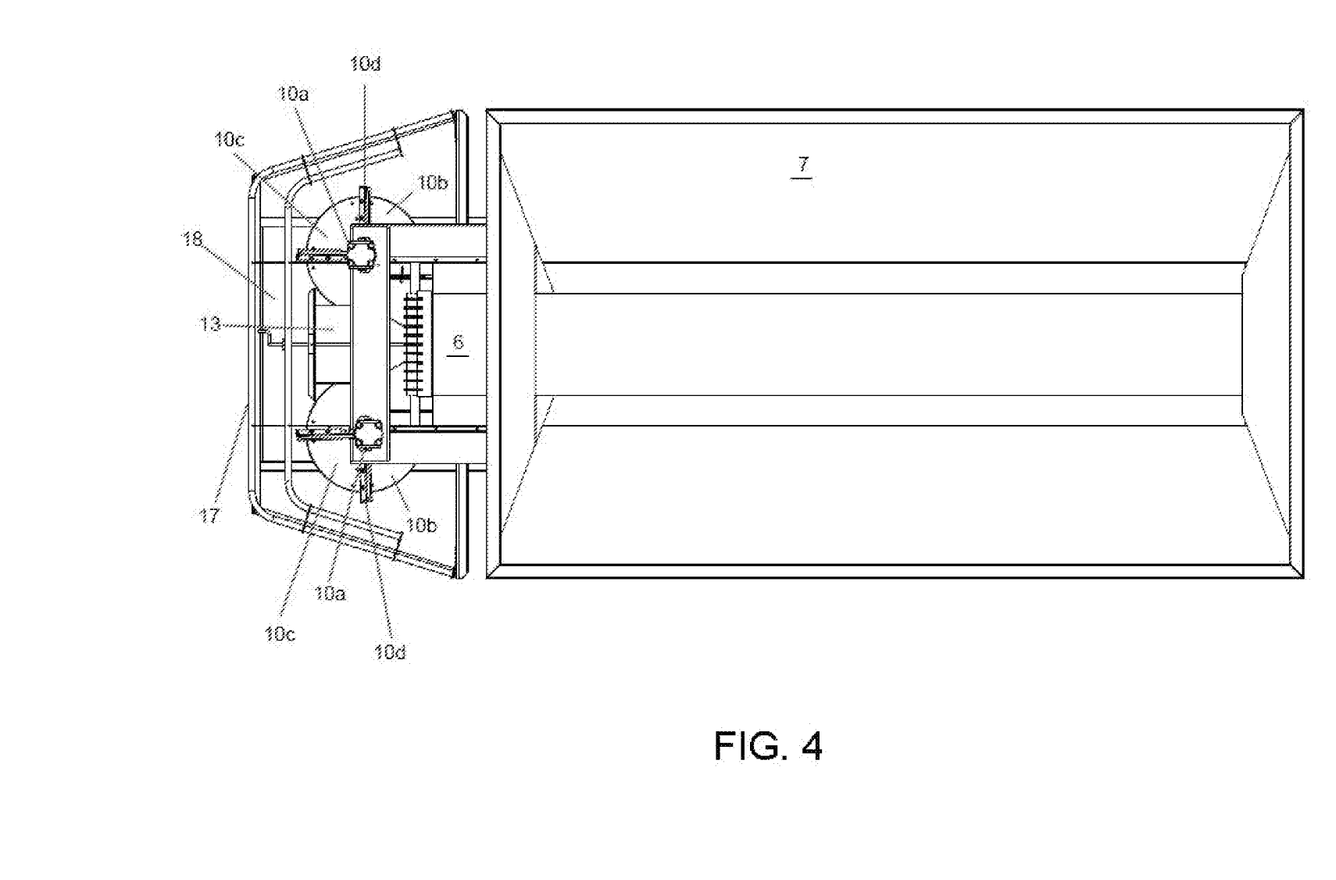
FIG. 4 is a top plan view of the system of FIG. 1.
Figure 5:
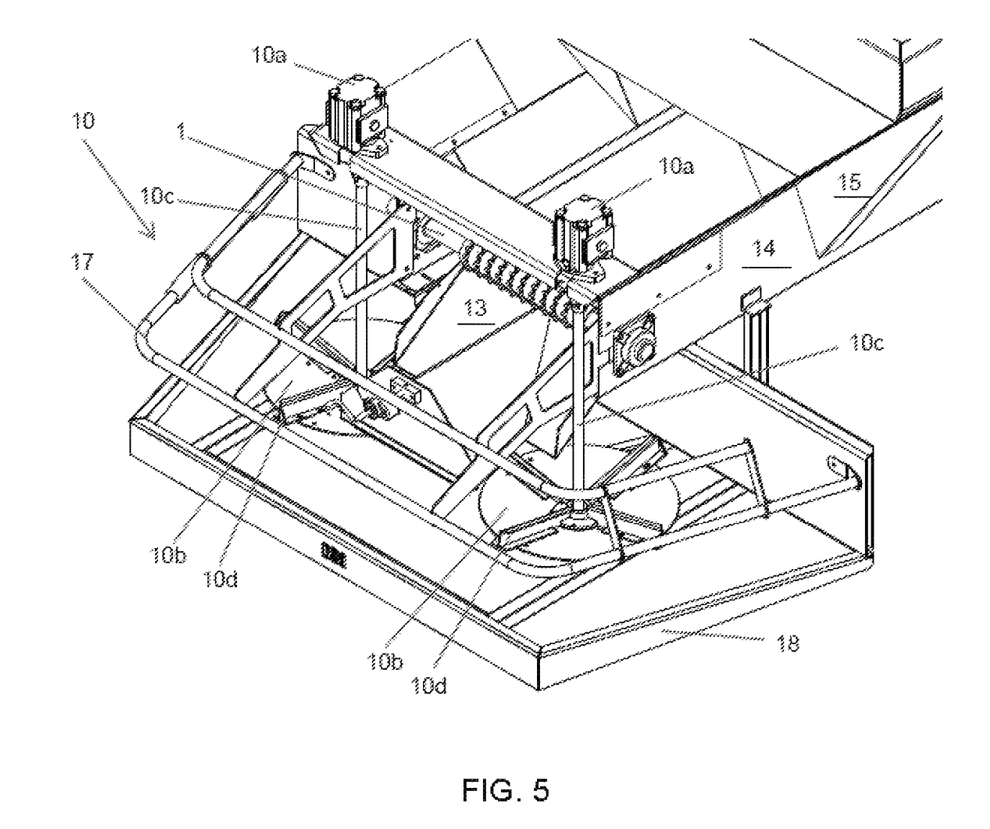
FIG. 5 is a sectional perspective view of the spreader system illustrated in FIGS. 1-4.

FIG. 3 is a right side view of the system of FIGS. 1 and 2. This figure illustrates a side elevational view of hopper 7. In one or more aspects primary material ingredient hopper 7 can include a metering device comprising a gate (as shown in U.S. Pat. No. 7,380,733) for controlling the rate of discharge of particulate material therefrom. The gate may be lowered to a near closed position for minimal discharge of material from hopper 7, or alternatively may be fully opened, or positioned somewhere between fully opened and fully closed. In an exemplary embodiment the gate can be positioned by manual settings. The position of gate along with the speed of take away conveyor 6 affects the rate of discharge of material from hopper 7. Rail extensions 12 can be provided to facilitate the spinner motors 10*a* being mounted farther apart due to the longer fins and larger spinner system diameters.

FIG. 2 illustrates a rear elevational view of the spreader system. Material discharged from the hopper 7 onto conveyor 6 is fed to rear roller 1. Spinners 10 can be fixed in position in relation to rear roller 1. Flow divider 13 can be positioned between rear roller 1 and spinners 10. The flow divider 13 serves to receive material from conveyor 6 and roller 1 and to direct the flow of the particulate material onto spinners 10. In an aspect where two spinners are provided as illustrated, flow divider 13 directs the material off of each of its sides to each of the spinners. Of course if only spinner is provided flow divider 13 may not be desired. The spreader system can also include a protective frame 17 fixed to the rear of the frame 14 of the bin system and positioned about the spreader system to protect the spreader system. The protective frame 17 can include a pan 18 positioned underneath the spinners 10 to collect overflow material not collected by the pinners 10.

In one or more other aspects, one or more secondary material ingredient hoppers can be positioned rearwardly of a primary ingredient hopper 7. Their converging walls can lead to transition box 4 that can include metering rollers. Take away conveyor 6 can be positioned below hopper 7 for receiving materials discharged from the hopper, for example through the gate. In an exemplary embodiment conveyor 6 extends longitudinally underneath hopper 7 and beyond its gate to the rear of the frame 14. Metering rollers can be positioned longitudinally along the frame 14, rearward of the gate for hopper 7 and above conveyor 6. Thus, material discharged by the metering rollers from the one or more material ingredient hoppers can be received by conveyor 6. When material ingredients have been discharged from hopper 7 onto conveyor 6, ingredients discharged from the one or more secondary material ingredient hoppers can be discharged on top of the primary ingredients from hopper 7 onto the same conveyor 6, as described and illustrated in U.S. Pat. No. 7,380,733. Conveyor 6 can direct the particulate material to rear roller 1.

Accompanying the systems typically would be either a simplified full hydraulic control system or an electronic control system, either of which is available from numerous sources. These systems are intended to control and adjust the discharge rate of the material from the one or more hoppers. The systems can optionally control parameters of the metering device and spinner rotational speed to achieve a desired spread pattern according to the density of material being spread and the material discharge rate. These controls control drive motor 1*a* for roller 1 that drives take away conveyor 6 and discharges materials to the one or more spinners 10, and in some cases may also control drive motor(s) 10*a* that serve to rotate spinner(s) 10. Additionally, these controls can control drive motors that control the rate of rotation of metering rollers of any one or more material ingredient hoppers provided. Thus, it can be seen the controller can control the rate of discharge of ingredients from any one or more secondary material ingredient hoppers and thus the ratio of the mixture of ingredients from secondary hoppers. Further, by controlling the rate of discharge of ingredients from secondary material ingredient hoppers, the ratio of secondary ingredients to the amount of primary ingredients discharged from hopper 7 can be controlled. By controlling the rate of rotation of rear roller 1, the rate of rotation of metering rollers, and/or the position of the gate on primary hopper 7, the overall rate of discharge of ingredients from all hoppers and the rate of broadcast of these ingredients onto a ground surface can be controlled.

Electronic controls are available for controlling the system and can be supplied by many suppliers of computerized rate controllers, provided by companies such as Trimble, Ag-Chem Equipment Co., Inc., Mid-Tech, Raven Industries, or Micro-Track. Exemplary controls include the control systems disclosed in U.S. Pat. No. RE 35,100, U.S. Pat. Nos. 6,198,986, 6,089,743, Hydraulic controls are also available, such as disclosed in US 2011/0303312. Each of the foregoing references is incorporated by reference as if fully set forth herein.

It can be seen from the above description that systems are provided that allow the operator, with the aid of any one of numerous control systems, to spread one or more material ingredients at independently varying or fixed rates. Farmers or commercial applicators may apply, for example, three material ingredients, such as N, P, K. (nitrogen, phosphorous and potassium), or at times two of these three and the third ingredient being one or more micronutrients such as trace elements (for example, boron, magnesium and/or sulfur), or a pH adjustment ingredient, such as lime. Further, the controls allow for different rates of discharging and broadcasting material ingredients at different rates at different locations on the field.

The pattern of the particulate material broadcast from spinners 10 can be fine tuned or adjusted by adjusting one or more of the rate of rotation of the spinners 10, the position of the flow divider 13 that diverts a portion of the discharge of ingredients to one spinner and another portion to the other spinner, and the position of the fins 10*d* on the spinners 10.

Where a range of values is provided, it is understood that each intervening value, to the tenth of the unit of the lower limit unless the context dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both are also included in the disclosure.

Ratios, geometric units (such as but not limited to a length, radius or diameter), amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-range encompassed within that range as if each numerical value and sub-range is explicitly recited. To illustrate, a ratio of one length to another length of "about 0.1% to about 5%" should be interpreted to include not only the explicitly recited ratio of about 0.1% to about 5%, but also include individual ratios (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about y".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

All publications and patents cited in this specification are incorporated by reference as if each individual publication or patent were specifically and individually indicated to be incorporated by reference as if fully set forth herein and are incorporated by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could differ from the actual publication dates that may need to be independently confirmed.

The afore-described systems are but exemplary embodiments of the present disclosure. Other embodiments may include as few as one hopper or more than three hoppers for discharging their respective material ingredients onto one or more take away conveyors 6. Additionally, metering rollers can be provided for controlling discharge material ingredients from any one or more secondary hoppers. Alternatively, each secondary hopper can have its own individual metering box and/or roller. One or more spinners 10 can be provided.

It should be emphasized that the above-described embodiments of the systems, particularly any "preferred" embodiments are merely possible examples of implementations, merely set forth for a clear understanding of the principles of the invention. One skilled in the art will readily recognize that many variations and modifications may be made to the above-described embodiment(s) without departing substantially from the spirit and principles of the invention. All such modifications and variations are intended to be included herein within the scope of this disclosure and protected by the following claim(s).

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An apparatus for broadcasting particulate or granular material over a ground surface, the apparatus comprising:

a pair of variable-speed spinners and a material conveyor, the pair of variable-speed spinners being positioned below a discharge end of the material conveyor, wherein each of said pair of variable-speed spinners comprises a dish-shaped disk having a center that is below a horizontal plane defined by a periphery of the dish-shaped disk, a plurality of interchangeable radially-disposed fins positioned on an upper side of each dish-shaped disk and radiating outwardly from a center of the dish-shaped disk with an adjustable angle relative to a radial of the dish-shaped disk, each of the fins having a top edge portion that is angled relative to a portion of the fin that is attached to the dish-shaped disk, at least a portion of the fin extending beyond a periphery of the dish-shaped disk; and an adjustable flow divider between the material conveyor and the spinner for directing and adjusting a flow of the material from the material conveyor onto the pair of variable-speed spinners, wherein each of the pair of variable-speed spinners is able to spin at a variable rotational speed and is positioned to receive material from the flow divider at a selected location about half way along a length of the fins such that the material is caught by portions of the fins traveling at a speed of about 60 to 70 feet per second and is accelerated to a velocity of about 110 to 157 feet per second at an end of the fins' radial length.

2. The apparatus according to claim 1, wherein each of the fins comprises a distal end that extends radially beyond a periphery of the dish-shaped disk.

3. The apparatus according to claim 1, wherein each of the fins comprises a proximal end that is approximately flush with a center shaft of the dish-shaped disk.

4. The apparatus according to claim 1, wherein each of the fins is fixed in an upwardly projecting position that is generally perpendicular to a top surface of the dish-shaped disk.

5. The apparatus according to claim 1, wherein the selected location for depositing the material on each of the pair of rotating variable-speed spinners is about 7 inches to about 9 inches radially from the center of the dish-shaped disk.

6. An apparatus for broadcasting particulate or granular material over a ground surface, the apparatus comprising:
one or more variable-speed spinners configured to be positioned generally horizontally below a discharge end of a material conveyor, wherein each of the one or more spinners comprises a dish-shaped disk having a diameter of about 24 inches to about 36 inches and having one or more generally radially-disposed fins fixed to an upper side of the dish-shaped disk and radiating outwardly from a center of the dish-shaped disk, wherein at least one of said one or more generally radially-disposed fins has an adjustable angle relative to a radial of the dish-shaped disk; and
an adjustable flow divider configured to be positioned between the material conveyor and the one or more variable-speed spinners for directing and adjusting a flow of the material from the material conveyor onto the one or more variable-speed spinners at a selected location that is about 7 inches to about 9 inches radially from the center of the dish-shaped disk.

7. The apparatus according to claim 6, wherein each of the one or more fins comprises a distal end that extends radially beyond a periphery of the dish-shaped disk.

8. The apparatus according to claim 6, wherein each of the one or more fins comprises a proximal end that is approximately flush with a center shaft of the dish-shaped disk.

9. The apparatus according to claim 6, wherein each of the one or more fins has a length of about 7 inches to about 17 inches.

10. The apparatus according to claim 6, wherein each of the one or more fins is fixed in an upwardly projecting position that is generally perpendicular to a top surface of the dish-shaped disk.

11. The apparatus according to claim 6, further comprising a variably controllable motor for controlling a rate of rotation of the one or more variable-speed spinners.

12. The apparatus according to claim 6, wherein the one or more variable-speed spinners comprises two variable-speed spinners disposed adjacent to each other and configured to be positioned below the discharge end of the material conveyor.

13. The apparatus according to claim 6, wherein the material deposited on the spinners at the selected location is caught by a portion of the fins traveling at a speed of 60 to 70 feet per second.

14. The apparatus according to claim 12, wherein the material accelerates along a length of the fin to a distal end of the fin to achieve a velocity of 110 to 157 feet per second.

15. The apparatus according to claim 6, wherein a length of the fin is from about 14 inches to about 18 inches.

16. The apparatus according to claim 6, wherein each of the one or more fins has a top edge portion that is angled relative to a portion of the fin that is attached to the dish-shaped disk.

17. The apparatus according to claim 6, wherein each of the one or more fins has an adjustable angle relative to a radial of the dish-shaped disk.

18. A method of broadcasting particulate or granular material over a ground surface, the method comprising:
conveying a material to a rotating variable-speed spinner via an adjustable flow divider, the variable-speed spinner comprising a dish-shaped disk having a generally radially-disposed fin on an upper side of the dish-shaped disk and radiating outwardly from a center of the dish-shaped disk,
wherein the adjustable flow divider is configured to direct and adjust a flow of the material from a material conveyor onto the rotating variable-speed spinner, and
wherein the generally radially-disposed fin has an adjustable angle relative to a radial of the dish-shaped disk;
depositing the material on the rotating variable-speed spinner at a selected location that is about half way along a length of the fin, wherein the material deposited on the rotating variable-speed spinner at the selected location is caught by a portion of the fin traveling at a speed of 60 to 70 feet per second; and
accelerating the material along the length of the fin to a distal end of the fin to achieve a velocity of 110 to 157 feet per second.

19. The method according to claim 18, wherein the selected location for depositing the material on the rotating variable-speed spinner is about 7 inches to about 9 inches radially from the center of the dish-shaped disk.

20. The method according to claim 18, wherein the rotating variable-speed spinner is rotated at a speed of 900-1000 rpm.

21. The method according to claim 18, wherein the distal end of the fin extends radially beyond a periphery of the dish-shaped disk, and wherein the fin further comprises a proximal end that is approximately flush with a center shaft of the dish-shaped disk, and wherein the fin is fixed in an upwardly projecting position that is generally perpendicular to a top surface of the dish-shaped disk.

22. The method according to claim 18, wherein the length of the fin is from about 14 inches to about 18 inches.

23. The method according to claim 18, wherein the rotating variable-speed spinner is adjacent a second rotating variable-speed spinner having a second dish-shaped disk, and wherein each of the dish-shaped disk and the second dish-shaped disk comprises a plurality of generally radially-disposed fins fixed to its upper side and radiating outwardly from its center.

24. The method according to claim 18, wherein the fin has a top edge portion that is angled relative to a portion of the fin that is attached to the dish-shaped disk.

* * * * *